United States Patent
Subramanian et al.

(10) Patent No.: US 11,725,530 B1
(45) Date of Patent: Aug. 15, 2023

(54) OFFTAKE SCOOPS FOR BLEED PRESSURE RECOVERY IN GAS TURBINE ENGINES

(71) Applicant: General Electric Company, Schenectady, NY (US)

(72) Inventors: Sesha Subramanian, Bengaluru (IN); Scott Alan Schimmels, Evendale, OH (US); Jeffrey D. Carnes, Lynn, MA (US); Vishnu Das K, Bengaluru (IN)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 17/749,929

(22) Filed: May 20, 2022

(51) Int. Cl.
*F01D 9/06* (2006.01)
*F01D 9/04* (2006.01)
*F01D 5/14* (2006.01)
*F01D 25/24* (2006.01)

(52) U.S. Cl.
CPC ............ *F01D 9/065* (2013.01); *F01D 5/145* (2013.01); *F01D 9/041* (2013.01); *F01D 25/24* (2013.01); *F05D 2240/126* (2013.01); *F05D 2240/60* (2013.01); *F05D 2260/606* (2013.01)

(58) Field of Classification Search
CPC .......... F01D 9/041; F01D 5/145; F01D 25/24; F05D 2240/126; F05D 2240/60; F05D 2260/606
See application file for complete search history.

(56) References Cited

U.S. PATENT DOCUMENTS

| 2,291,828 | A | * | 8/1942 | New | F01D 5/145 |
|---|---|---|---|---|---|
| | | | | | 415/115 |
| 4,415,310 | A | | 11/1983 | Bouiller et al. | |
| 5,205,706 | A | | 4/1993 | Belcher | |
| 6,109,868 | A | * | 8/2000 | Bulman | F04D 27/023 |
| | | | | | 415/185 |
| 6,325,595 | B1 | * | 12/2001 | Breeze-Stringfellow | |
| | | | | | F01D 17/10 |
| | | | | | 415/144 |
| 6,428,271 | B1 | * | 8/2002 | Ress, Jr. | F04D 29/682 |
| | | | | | 415/914 |
| 6,550,254 | B2 | * | 4/2003 | Proctor | F01D 9/041 |
| | | | | | 60/785 |
| 6,986,638 | B2 | | 1/2006 | Austin et al. | |
| 7,594,793 | B2 | * | 9/2009 | Guemmer | F01D 5/143 |
| | | | | | 415/144 |
| 8,292,567 | B2 | * | 10/2012 | Damle | F01D 9/041 |
| | | | | | 415/144 |

(Continued)

FOREIGN PATENT DOCUMENTS

EP  2715144 A1  4/2014
GB  2536628 A  *  9/2016  ............ F01D 11/001

*Primary Examiner* — Brian Christopher Delrue
(74) *Attorney, Agent, or Firm* — Hanley, Flight & Zimmerman, LLC

(57) ABSTRACT

An example gas turbine engine includes a compressor including a casing defining a passageway and a shaft extending through the passageway. The shaft drivingly coupling the compressor and a turbine of the gas turbine engine. The shaft has an opening to receive airflow from the passageway. The gas turbine engine also includes an inner shroud, stator vanes coupled to and extending radially between the casing and the inner shroud, and an offtake scoop disposed on a downstream side of the inner shroud. The offtake scoop has a channel to direct the airflow radially inward toward the opening in the shaft.

20 Claims, 5 Drawing Sheets

(56) References Cited

U.S. PATENT DOCUMENTS

| | | | | |
|---|---|---|---|---|
| 9,032,738 | B2* | 5/2015 | Laurello | F04D 29/321 |
| | | | | 60/785 |
| 9,103,281 | B2* | 8/2015 | King | F04D 29/321 |
| 9,175,567 | B2* | 11/2015 | Aggarwala | F01D 5/143 |
| 10,227,930 | B2* | 3/2019 | Saxena | F04D 29/542 |
| 10,451,084 | B2* | 10/2019 | Subramanian | F01D 11/001 |
| 10,577,966 | B2 | 3/2020 | Subramanian et al. | |
| 10,822,987 | B1 | 11/2020 | Tardif et al. | |
| 2003/0133796 | A1* | 7/2003 | Munsell | B64D 13/00 |
| | | | | 416/97 R |
| 2006/0277919 | A1* | 12/2006 | Martensson | F02C 6/08 |
| | | | | 60/785 |
| 2007/0137175 | A1* | 6/2007 | Moniz | F01D 17/105 |
| | | | | 60/785 |
| 2012/0060506 | A1* | 3/2012 | King | F02C 6/08 |
| | | | | 60/785 |
| 2013/0017095 | A1* | 1/2013 | Lee | F01D 5/141 |
| | | | | 416/239 |
| 2013/0089416 | A1* | 4/2013 | Bouchard | F01D 25/162 |
| | | | | 415/198.1 |
| 2013/0111906 | A1* | 5/2013 | Bouchard | F02C 7/24 |
| | | | | 60/694 |
| 2016/0177833 | A1* | 6/2016 | Simon-Delgado | F01D 5/085 |
| | | | | 415/1 |
| 2020/0386109 | A1 | 12/2020 | Becker | |

\* cited by examiner

OFFTAKE SCOOPS FOR BLEED PRESSURE RECOVERY IN GAS TURBINE ENGINES

FIELD OF THE DISCLOSURE

The present disclosure relates generally to gas turbine engines and, more particularly, to bleed pressure recovery in gas turbine engines.

BACKGROUND

Turbofan engines, such as those used on aircraft, generally include a fan, a gas turbine engine to drive the fan, and an outer bypass duct. The gas turbine engine includes one or more compressor(s), a combustor, and one or more turbine(s) in a serial flow arrangement. Some gas turbine engines extract high pressure air from one of the compressor(s), known as "bleed air." This bleed air is routed to the turbine(s) for cooling the turbine(s).

BRIEF DESCRIPTION OF THE DRAWINGS

A full and enabling disclosure of the presently described technology, including the best mode thereof, directed to one of ordinary skill in the art, is set forth in the specification, which makes reference to the appended Figs., in which.

Figure 1:
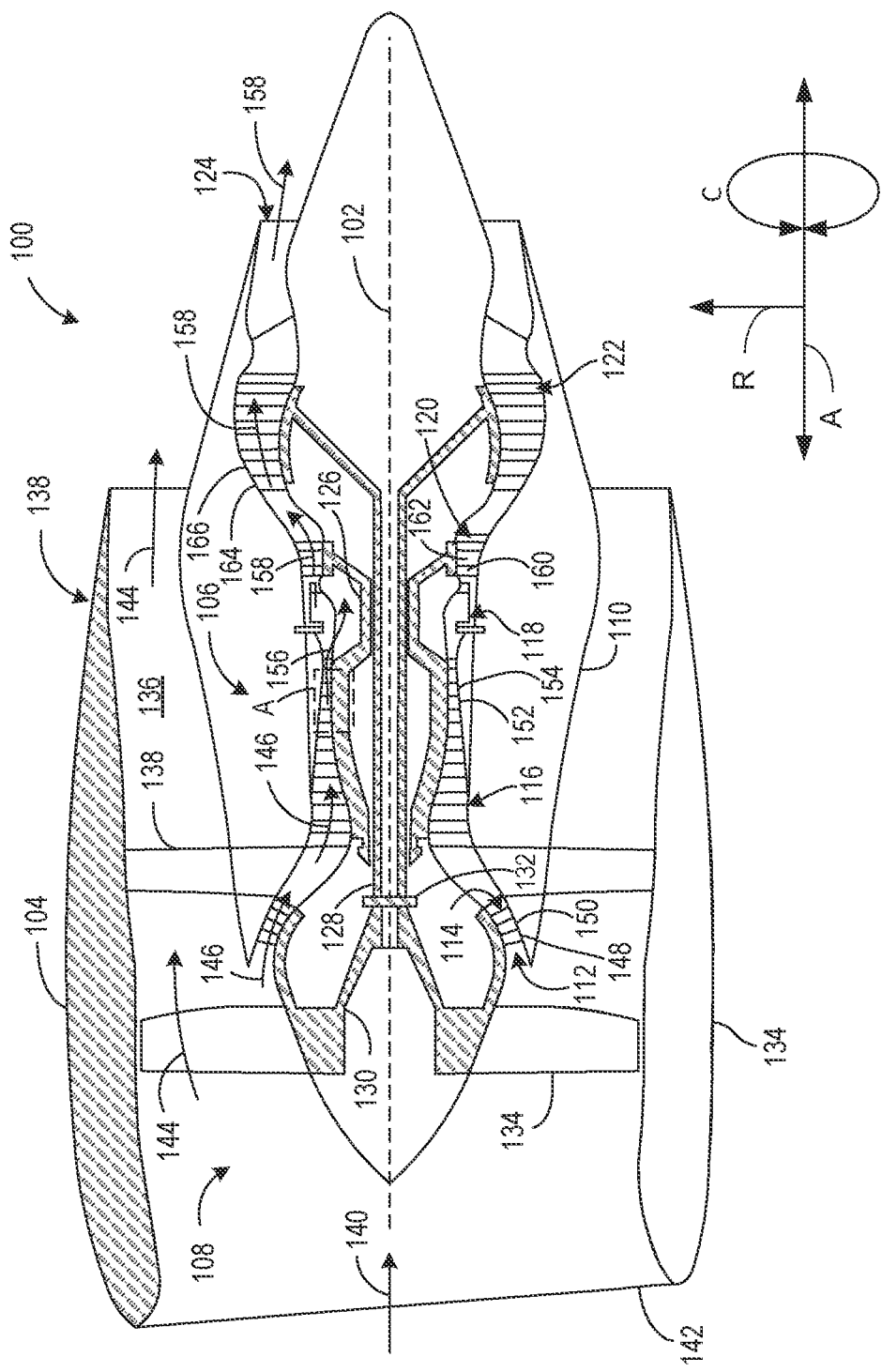
FIG. 1 is a schematic cross-sectional view of an example turbofan engine in which examples disclosed herein can be implemented.

Repeat use of reference characters in the present specification and drawings is intended to represent the same or analogous features or elements of the present disclosure.

DETAILED DESCRIPTION

Reference now will be made in detail to embodiments or examples of the presently described technology, one or more examples of which are illustrated in the drawings. Each example is provided by way of explanation of the presently described technology, not limitation of the presently described technology. In fact, it will be apparent to those skilled in the art that various modifications and variations can be made in the presently described technology without departing from the scope or spirit of the presently described technology. For instance, features illustrated or described as part of one embodiment or example can be used with another embodiment or example to yield a still further embodiment or example. Thus, it is intended that the presently described technology covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Disclosed herein are example offtake scoops and example inner shrouds having example offtake scoops that improve bleed air flow in gas turbine engines. Turbofan engines, such as those used on aircraft, include a gas turbine engine. A gas turbine engine includes a compressor, a combustor, and a turbine in a serial flow arrangement. The gas turbine engine includes a shaft that operably couples the turbine and the compressor, such that the turbine drives the compressor during operation of the gas turbine engine. In some instances, the gas turbine engine is designed to extract some of the high pressure air from the compressor. This extracted air is typically referred to as "bleed air." The bleed air is routed to the turbine for cooling the turbine, which improves efficiency of the gas turbine engine.

To extract this bleed air from the compressor, a section of the shaft in the compressor has an opening (sometimes referred to as a bleed opening or port). A portion of the high pressure air in the compressor flows through the opening and into an inner passageway of the shaft. The inner passageway (and one or more channels or tubes) directs the airflow downstream to the turbine for cooling the turbine. For example, the airflow can be used for cooling the turbine blades and rotating disks for cyclic life and for hardware durability (both static and rotating). This improves blade tip clearance, which yields improved efficiency (compression and/or work extraction). Additionally or alternatively, the air can be used for services such as sump pressurization, sump cooling, fuel systems, and/or systems managing external valves, pumps, gear boxes, Full Authority Digital Engine Control (FADEC) computers, etc. However, the airflow in the compressor outside of the opening often undergoes significant pressure loss, while travelling radially inwards due to vortexing. This reduces the pressure of the bleed air in the inner passageway of the shaft, which adversely impacts the cooling of the downstream turbine blades and rotating components.

Disclosed herein are example offtake scoops and example inner shrouds having example offtake scoops that improve the airflow into the opening of the shaft. The compressor of the gas turbine engine includes a casing and a plurality of stator vanes that extend radially inward from the casing. The compressor includes an inner shroud, which is a circular or ring-shaped member that surrounds the shaft. The radially inner ends of the stator vanes are coupled to the inner shroud, such that the stator are coupled to and extend radially between the casing and the inner shroud. In some examples disclosed herein, an example offtake scoop is disposed on a downstream side of the inner shroud. The offtake scoop directs airflow exiting the stator vanes radially inward toward the opening in the shaft. As such, the airflow is smoother or more laminar, which improves the bleed pressure recovery and cooling supply air back flow margin.

In some examples, the offtake scoop includes an upstream wall and a downstream wall that is spaced apart from the upstream wall, such that a channel is formed between the upstream and downstream walls. The channel is shaped to direct airflow from the compressor radially inward toward the opening in the shaft. In some examples, the offtake scoop includes a guide vane in the channel. The guide vane helps further improve airflow toward the opening. In some examples, the guide vane has an airfoil-shaped cross-section. In some examples, the offtake scoop is integrally formed with a portion of the inner shroud. For example, the inner shroud can include a body and a panel on a radially outer side of the body. In some examples, the panel is sheet metal. In some examples, the offtake scoop is coupled to the downstream side of the panel. For example, the upstream wall can be an extension or part of the panel that is curved radially inward.

Referring now to the drawings, wherein identical numerals indicate the same elements throughout the figures, FIG. 1 is a schematic cross-sectional view of an example high-bypass turbofan-type gas turbine engine 100 ("turbofan engine 100") that can incorporate various examples disclosed herein. While the illustrated example is a high-bypass turbofan engine, the principles of the present disclosure are also applicable to other types of engines, such as low-bypass turbofans, turbojets, turboprops, etc.

As shown in FIG. 1, the turbofan engine 100 includes an outer bypass duct 104 (which may also be referred to as a nacelle, fan duct, or outer casing), a gas turbine engine 106 (which may also be referred to as a core turbine engine or turbo-machinery), and a fan section 108. The gas turbine engine 106 and the fan section 108 are disposed at least partially in the outer bypass duct 104. The gas turbine engine 106 is disposed downstream from the fan section 108 and drives the fan section 108 to produce forward thrust. As shown in FIG. 1, the turbofan engine 100 and/or the gas turbine engine 106 define a longitudinal or axial centerline axis 102 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 102, the radial direction R is a direction that extends orthogonally outward from or inward toward the centerline axis 102, and the circumferential direction C is a direction that extends concentrically around the centerline axis 102.

The gas turbine engine 106 includes a substantially tubular outer casing 110 (which may also be referred to as a mid-casing) that defines an annular inlet 112. The outer casing 110 of the gas turbine engine 106 can be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustion section 118 (which may also be referred to as the combustor 118), a turbine section having a high pressure turbine 120 ("HP turbine 120") and a low pressure turbine 122 ("LP turbine 122"), and an exhaust section 124. The gas turbine engine 106 includes a high pressure shaft or spool 126 ("HP shaft 126") drivingly couples the HP turbine 120 and the HP compressor 116. The gas turbine engine 106 also includes a low pressure shaft or spool 128 ("LP shaft 128") that drivingly couples the LP turbine 122 and the LP compressor 114. The LP shaft 128 may also couple to a fan spool or shaft 130 of the fan section 108. In some examples, the LP shaft 128 may couple directly to the fan shaft 130 (i.e., a direct-drive configuration). In alternative configurations, the LP shaft 128 may couple to the fan shaft 130 via a reduction gear 132 (i.e., an indirect-drive or geared-drive configuration). While in this example the gas turbine engine 106 includes two compressor and two turbines, in other examples, the gas turbine engine 106 may only include one compressor and one turbine.

As shown in FIG. 1, the fan section 108 includes a plurality of fan blades 134 coupled to and extending radially outwardly from the fan shaft 130. The outer bypass duct 104 circumferentially encloses the fan section 108 and/or at least a portion of the gas turbine engine 106. In particular, the gas turbine engine 106 is disposed in the outer bypass duct 104 such that a bypass airflow passage or duct 136 is formed between the outer casing 110 of the gas turbine engine 106 and the outer bypass duct 104. The outer bypass duct 104 may be supported relative to the gas turbine engine 106 by a plurality of circumferentially-spaced apart outlet guide vanes 138.

As illustrated in FIG. 1, during operation of the turbofan engine 100, air 140 enters an inlet portion 142 of the turbofan engine 100. The air 140 is accelerated by the fan blades 134. A first portion 144 of the air 140 flows into the bypass airflow passage 136, while a second portion 146 of the air 140 flows into the inlet 112 of the gas turbine engine 106 (and, thus, into the LP compressor 114). One or more sequential stages of LP compressor stator vanes 148 and LP compressor rotor blades 150 coupled to the LP shaft 128 progressively compress the second portion 146 of the air 140 flowing through the LP compressor 114 en route to the HP compressor 116. Next, one or more sequential stages of HP compressor stator vanes 152 and HP compressor rotor vanes 154 coupled to the HP shaft 126 further compress the second portion 146 of the air 140 flowing through the HP compressor 116. This provides compressed air 156 to the combustion section 118 where it mixes with fuel and burns to provide combustion gases 158.

The combustion gases 158 flow through the HP turbine 120 where one or more sequential stages of HP turbine stator vanes 160 and HP turbine rotor blades 162 coupled to the HP shaft 126 extract a first portion of kinetic and/or thermal energy. This energy extraction supports operation of the HP compressor 116. The combustion gases 158 then flow through the LP turbine 122 where one or more sequential stages of LP turbine stator vanes 164 and LP turbine rotor blades 166 coupled to the LP shaft 128 extract a second portion of thermal and/or kinetic energy therefrom. This energy extraction causes the LP shaft 128 to rotate, which supports operation of the LP compressor 114 and/or rotation of the fan shaft 130. The combustion gases 158 then exit the gas turbine engine 106 through the exhaust section 124 thereof. The combustion gases 158 mix with the first portion 144 of the air 140 from the bypass airflow passage 136 to produce propulsive thrust.

Along with the turbofan engine 100, the gas turbine engine 106 serves a similar purpose and sees a similar environment in land-based gas turbines, turbojet engines in which the ratio of the first portion 144 of the air 140 to the second portion 146 of the air 140 is less than that of a turbofan, and unducted fan engines in which the fan section 108 is devoid of the outer bypass duct 104. In each of the turbofan, turbojet, and unducted engines, a speed reduction device (e.g., the reduction gear 132) may be included between any shafts and spools. For example, the reduction gear 132 may be disposed between the LP shaft 128 and the fan shaft 130 of the fan section 108.

Figure 2:
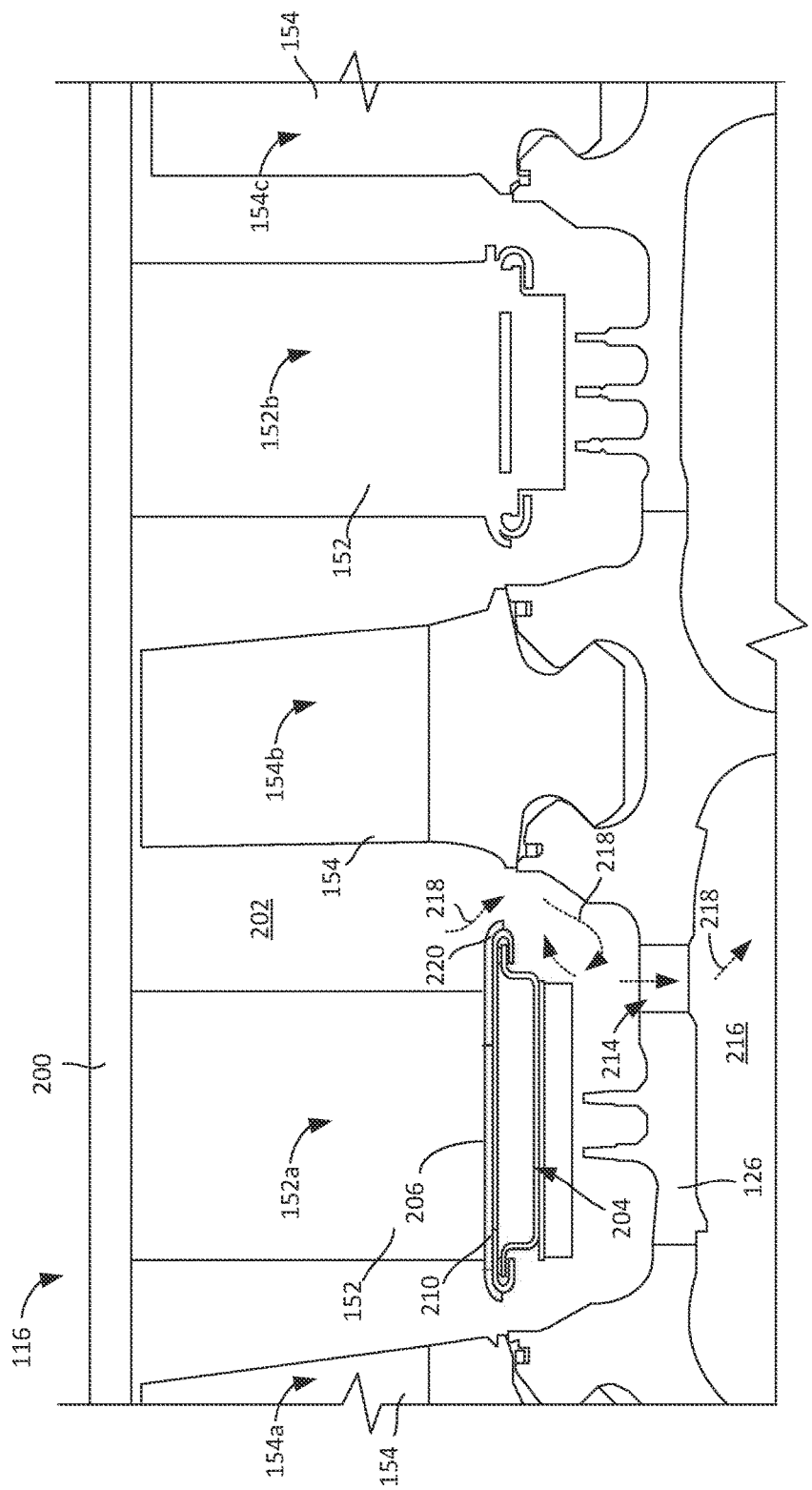
FIG. 2 is an enlarged view of the callout in FIG. 1 showing a portion of an example high pressure compressor of the example turbofan engine with a known inner shroud.
Figure 2:
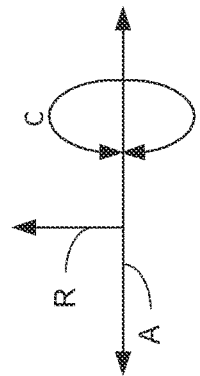

FIG. 2 is an enlarged view of the callout A from FIG. 1 showing a portion of the HP compressor 116 of the gas turbine engine 106 from FIG. 1. FIG. 2 shows a known inner shroud design, described in further detail below. The HP compressor 116 includes a casing 200. The casing 200 can correspond to the outer casing 110 a portion of the outer casing 110. The casing 200 defines a passageway 202 through which air flows (e.g., the second portion 146 of the air 140 (FIG. 1)). The HP shaft 126 extends through the passageway 202. As disclosed above, the HP compressor 126 includes a plurality of rotor vanes 154 (three of which are shown in FIG. 2). The rotor vanes 154 are coupled to and extend radially outward from the HP shaft 126. The rotor vanes 154 are arranged in multiple rows or stages. Three example stages 154a-154c are labeled in FIG. 2. The stages 154a-154c are spaced apart in the axial direction (A). Each of the stages 154a-154c includes a plurality of the rotator vanes 154 distributed circumferentially around the HP shaft 126. During operation of the gas turbine engine 106 (FIG. 1), the rotor vanes 154 rotate with the HP shaft 126.

The HP compressor 116 also includes a plurality of stator vanes 152. The stator vanes 152 are coupled to and extend radially inward from the casing 200. The stator vanes 152 are also arranged in multiple rows or stages. Two example stages 152a, 152b are labeled in FIG. 2. The stages 152a, 152b are spaced apart in the axial direction (A). The stages 152a, 152b of the stator vanes 152 are arranged between the stages 154a-154c of the rotor vanes 154. Each of the stages 152a, 152b includes a plurality of the stator vanes 152 distributed circumferentially around the casing 200. The HP compressor 116 may have any number of stages of the stator vanes 152 and the rotor vanes 154. The stages of the stator vanes 152 and the rotor vanes 154 shown in FIG. 2 can correspond to any of the stages, such as the beginning stages, middles stages, or end stages. During operation of the gas turbine engine 106, air flows through the passageway 202, and through each of the stages of the stator vanes 152 and the rotor vanes 154, which progressively increases the pressure of the air, before arriving at the combustor 118 (FIG. 1).

As shown in FIG. 2, the HP compressor 116 includes an inner shroud 204, which is a circular or annular member. The inner shroud 204 is disposed in the passageway 202 and encircles or surrounds the HP shaft 126 but does not physically touch the HP shaft 126. The stator vanes 152 of the first stage 152a are coupled to the inner shroud 204. In particular, radially inner ends 206 (one of which is referenced in FIG. 1) of the stator vanes 152 of the first stage 152a are coupled to the inner shroud 204. Therefore, the stator vanes 152 are coupled to an extend radially between the casing 200 and the inner shroud 204. In some examples, the inner shroud 204 is a continuous circular or annular member. In other examples, the inner shroud 204 can be formed two or more portions that are separate from each other. In the illustrated example, the inner shroud 204 includes a panel 210. The panel 210 is disposed on and/or otherwise forms a radially outer side of the inner shroud 204. The radially inner ends 206 of the stator vanes 152 are coupled to the panel 210. In some examples, the panel 210 is a sheet metal panel. The panel 210 enables the air to flow smoothly along the inner shroud 204. The HP compressor 116 can include similar inner shrouds for each of the other stages of the stator vanes 152.

Figure 3:
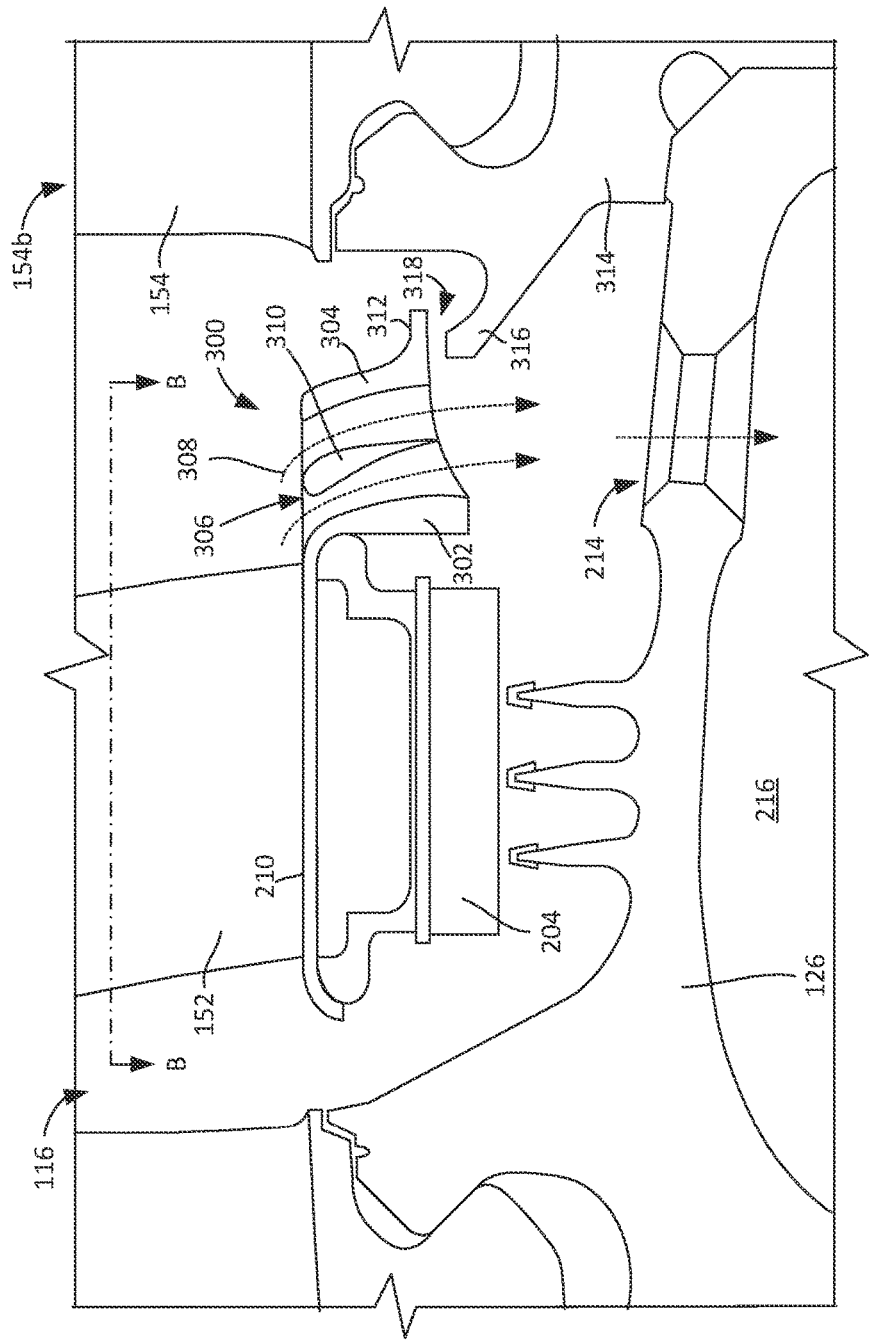
FIG. 3 shows the enlarged view of FIG. 2 with an example offtake scoop constructed in accordance with the teachings of this disclosure.
Figure 3:
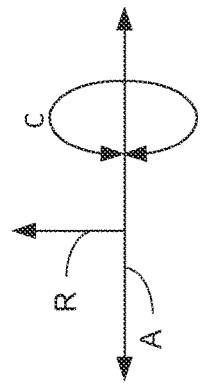

In the illustrated example of FIG. 2, the HP shaft 126 has an opening 214, which may also be referred to as a bleed opening or port. In particular, as shown in FIG. 3, the HP shaft 126 defines an inner passageway 216. During operation of the gas turbine engine 106 (FIG. 1), a portion of the high pressure air from the passageway 202 exiting the first stage 152a of the stator vanes 152 flows through the opening 214 and into the inner passageway 216, as shown by dotted airflow lines 218. In some examples, the HP shaft 126 includes multiple openings that are spaced apart and arranged circumferentially around the HP shaft 126. This high pressure air is sometimes referred to as "bleed air" because it is "bled" from the HP compressor 116. The inner passageway 216 is fluidly coupled by one or more channels, passageways, and/or tubes the HP turbine 120. As such, the bleed air directed through the opening 214 and into the inner passageway 216 is routed to the HP turbine 120 (FIG. 1). Therefore, the opening 214 receives airflow from the passageway 202 to be used for cooling the HP turbine 120 (FIG. 1). The air helps cool the HP turbine 120 and therefore improves efficiency of the gas turbine engine 106. In general, the airflow 218 exiting the first stage 152a of the stator vanes 152 flows radially inward and into the opening 214. In the illustrated example, the panel 210 has a downstream edge 220 this rounded or covered, which is intended to help direct the airflow 218 toward the opening 214. However, as shown by the airflow lines 218 in FIG. 2, the air tends to circulate in the area between the inner shroud 204 and the HP shaft 126. This reduces the bleed air capacity of the HP shaft 126. In some instances, if the pressure in the inner passageway 216 is not a sufficient pressure, the air can flow backward, i.e., back through the opening 214 and into the passageway 202 of the HP compressor 116. This significantly reduces or affects the cooling operation of the HP turbine 120.

Disclosed herein are example apparatus that increase the airflow toward the opening 214 to improve the bleed capacity. For example, FIG. 3 illustrates an example offtake scoop 300 constructed in accordance with the teachings of this disclosure. In particular, FIG. 3 shows the example offtake scoop 300 implemented in connection with the inner shroud 204 of the HP compressor 116. The offtake scoop 300 is disposed on a downstream side of the inner shroud 204. The offtake scoop 300 can be considered part of the inner should 204 or a separate component that is coupled to the inner shroud 204. The offtake scoop 300 is circular or annular and encircles the HP shaft 126 with the inner shroud 204. In the illustrated example of FIG. 3, the offtake scoop 300 is coupled to and/or integrally formed with the panel 210.

In the illustrated example of FIG. 3, the offtake scoop 300 includes an upstream wall 302 and a downstream wall 304 spaced apart from the upstream wall 302, such that a channel 306 is formed between the upstream and downstream walls 302, 304. The channel 306 directs the airflow exiting the first stage 152a of the stator vanes 152 radially inward toward the opening 214 and into the inner passageway 216, as shown by the dotted airflow lines 308. As shown in FIG. 3, the shape of the channel 306 helps direct the airflow in a smoother, more laminar manner toward the opening 214. This reduces (e.g., minimizes) or limits circulation in the area between the inner shroud 204 and the HP shaft 126, which improves airflow into the opening 214. This increase or improves the bleed air capacity of the HP shaft 126.

In some examples, as illustrated in FIG. 3, the offtake scoop 300 includes a guide vane 310. The guide vane 310 is disposed in the channel 306 between the upstream and downstream walls 302, 304. The guide vane 310 helps further direct the airflow in a laminar manner radially inward toward the opening 214. In this example, the guide vane 310 has an airfoil-shaped cross-section. In some examples, this helps reduce tip loss. In other examples, the guide vane 310 can have a different cross-sectional shape (e.g., rectilinear, triangular, oval, etc.). In this example, the guide vane 310 is disposed in a center of the channel and equally spaced from the upstream and downstream walls 302, 304. In other examples, the guide vane 310 can be closer to or further from the upstream wall 302 and/or the downstream wall 304. The guide vane 310 divides the channel 306 into two sub-channels. In other examples, the offtake scoop 300 can include more than one guide vane (e.g., two, three, four, etc.) that divide the channel 306 into more sub-channels. In other examples, the offtake scoop 300 may not include any guide vanes. Instead, in some examples, the channel 306 can be empty.

In the illustrated example, the offtake scoop 300 includes a stator discourager 312 (e.g., a flange) extending from the downstream wall 304. The stator discourager 312 extends axially downstream from the downstream wall 304 (to the right in FIG. 3). The stator discourager 312 may be integrally formed with the downstream wall 304. In the illustrated example, the HP shaft 126 has a root or hub 314. The rotor vanes 154 of the second stage 154b are coupled to the HP shaft 126 at the hub 314. The hub 314 is downstream of the inner shroud 204. In the illustrated example, the hub 314 includes a rotor discourager 316 (e.g., an arm or flange). The rotor discourager 316 extends axially upstream (to the left in FIG. 3) from the hub 314 and radially outward (up in FIG. 3). As such, the stator discourager 312 and the rotor discourager 316 overlap in the radial direction (R). As shown in FIG. 3, a gap 318 is formed between the stator discourager 312 and the rotor discourager 316. The gap 318 can be relatively small. However, the stator discourager 312 and the rotor discourager 316 are not in contact, since the hub 314 is rotating with the rotor vanes 154 but the offtake scoop 300 is stationary with the stator vanes 152. The configuration of the stator discourager 312 and the rotor discourager 316 may be referred to as a flow discourager. This configuration of the stator discourager 312 and the rotor discourager 316 prevents the airflow 308 from circulating radially outward away from the opening 214 and, thus, helps improve airflow toward the opening 214.

Figure 4:
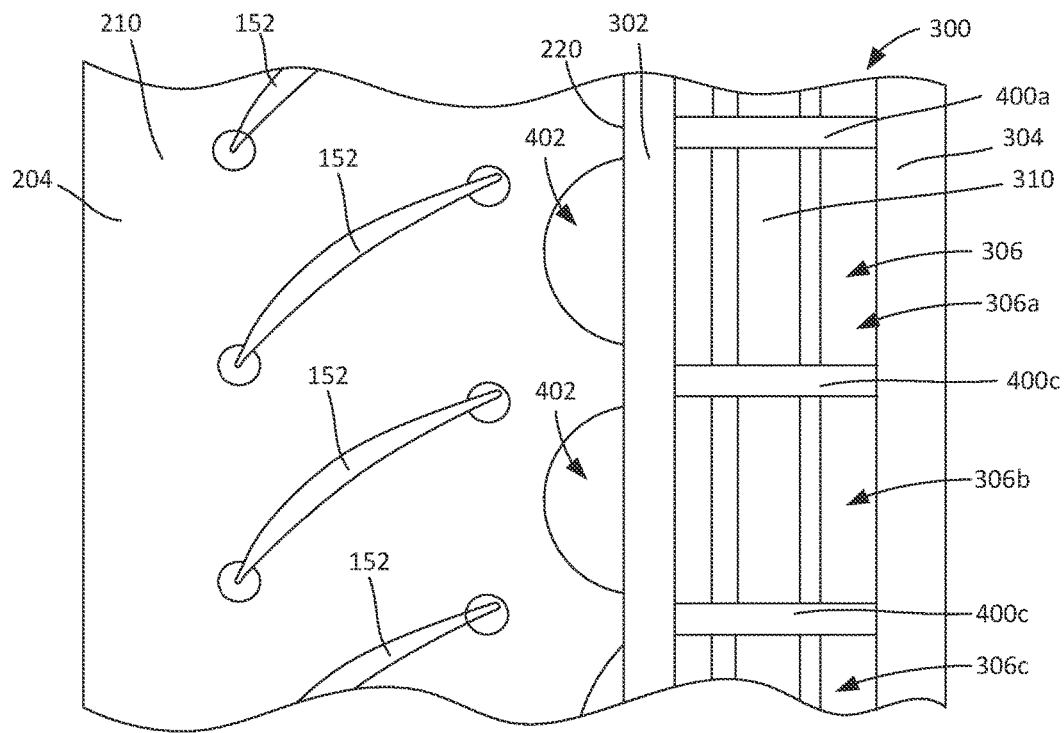
FIG. 4 is a cross-sectional view taken along line B-B of FIG. 3 showing the example offtake scoop.
Figure 5:
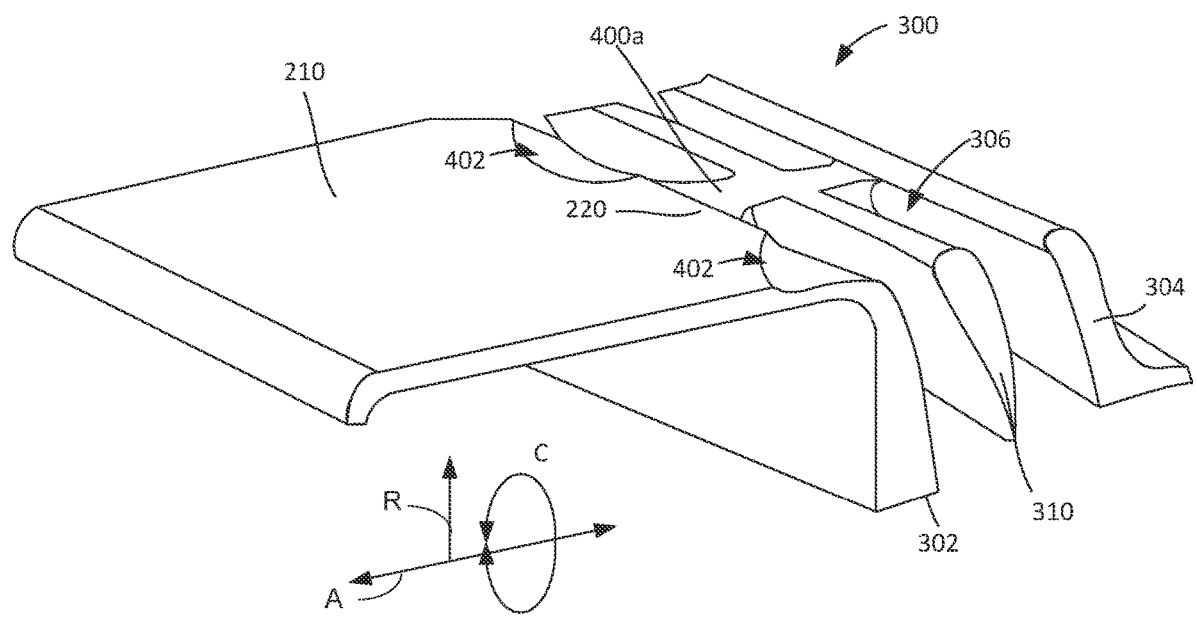
FIG. 5 is perspective cross-sectioned view of a portion of the example offtake scoop of FIGS. 3 and 4.

FIG. 4 is a cross-sectional view taken along line B-B of FIG. 3. FIG. 4 shows a plurality of the stator vanes 152. The stator vanes 152 are coupled to the panel 210 of the inner shroud 204. The offtake scoop 300 is disposed along the downstream side of the panel 210 of the inner shroud 204. FIG. 5 is a perspective view of a portion of the panel 210 and the offtake scoop 300. FIGS. 4 and 5 are describe together below.

In the illustrated example of FIGS. 4 and 5, the upstream wall 302 of the offtake scoop 300 is an extension or part of the panel 210. For example, the downstream side of the panel 210 is curved radially inward, which forms the upstream wall 302 of the offtake scoop 300. As such, in some examples, the panel 210 and the upstream wall 302 are integrally formed as a single unitary part or component. As disclosed above, in some examples the panel 210 is a sheet metal panel. The downstream wall 304 is spaced apart from the upstream wall 302, which forms the channel 306. The guide vane 310 is in the channel 306 between the upstream and downstream walls 302, 304. As shown in FIGS. 4 and 5, the upstream wall 302, the downstream wall 304, and the guide vane 310 are parallel to and spaced apart from each other.

In the illustrated example of FIGS. 4 and 5, the offtake scoop 300 includes a rib 400a (which may also be referred to as a web) extending between the upstream wall 302 and the downstream wall 304. The rib 400a provides stiffness and rigidity to the offtake scoop 300. The rib 400a couples the upstream wall 302, the downstream wall 304, and the guide vane 310. The rib 400a also supports the downstream wall 304 and the guide vane 310 axially downstream from the upstream wall 302. In some examples, the offtake scoop 300 includes a plurality ribs. For example, as shown in FIG. 4, additional ribs 400b and 400c are shown. The offtake scoop 300 can include any number of ribs (e.g., four, five, etc.). In some examples, the ribs 400a-400c are spaced apart at a certain interval, such as every ten centimeters, every 50 centimeters, etc. The ribs 400a-400c divide the channel 306 into channel portions or segments 306a-306c (FIG. 4) between adjacent ones of the ribs 400a-400c. In some examples, the upstream wall 302, the downstream wall 304, the guide vane 310, and the rib(s) 400a-400c are integrally formed (e.g., constructed as a monolithic structure). In some examples, the panel 210 and the offtake scoop 300 are integrally formed. For example, the panel 210, the upstream wall 302, the downstream wall 304, the guide vane 310, and the rib(s) 400a-400c can be integrally formed. In other examples, one or more of the panel 210, the upstream wall 302, the downstream wall 304, the guide vane 310, and the rib(s) 400a-400c can be formed as separate components that are coupled (e.g., via welding, via fasteners, etc.) to the adjacent structures. In some examples, the panel 210 and the offtake scoop 300 are manufactured by one or more manufacturing processes such as stamping, extruding, machining, and/or any other forming or substrative manufacturing process. Additionally or alternatively, the panel and/or the offtake scoop 300 can be manufactured by additive manufacturing, sometimes referred to as 3D printing.

In the illustrated example of FIGS. 4 and 5, the panel 210 includes a plurality of recesses 402 (which may also be referred to as extraction scoops) formed in a top surface of the panel 210. The recesses 402 are disposed along the downstream edge 220 of the panel 210. The recesses 402 are spaced apart from each other, and each of the recesses 402 are aligned with respective ones of the channel segments 306a-306c. The recesses 402 direct the airflow into the channel 306. In particular, the airflow exiting the stator vanes 152 follows the recesses 402 and into the channel 306. This provides a smoother transition for the airflow to curve radially inward. Therefore, the recesses 402 help improve airflow into the channel 306 and, thus, into the opening 214 for the bleed air pressure. However, in other examples, the panel 210 may not include any recesses.

While in some examples the bleed air is used to cool the HP turbine 120, in other examples, the bleed air can be used to cool the LP turbine 122. Additionally or alternatively, the bleed air can be used for various other purposes in the turbofan engine 100 and/or the aircraft. For example, the bleed air can be used to pressurize certain seals in the gas turbine engine 106, which helps maintain tighter fittings and tolerances. Further, if the turbofan engine 100 is used on an aircraft, the bleed air can be used to power and/or provide a constant supply of air for one or more systems, such as an environmental control system (ECS) (which provides pressurized and temperature-controlled air to the cabin), a wing anti-icing system, and/or an engine anti-icing system. Also, while the example offtake scoop 300 is described in connection with the HP compressor 116, the example offtake scoop 300 can be similarly implemented in one or more locations of the LP compressor 114.

Figure 6:
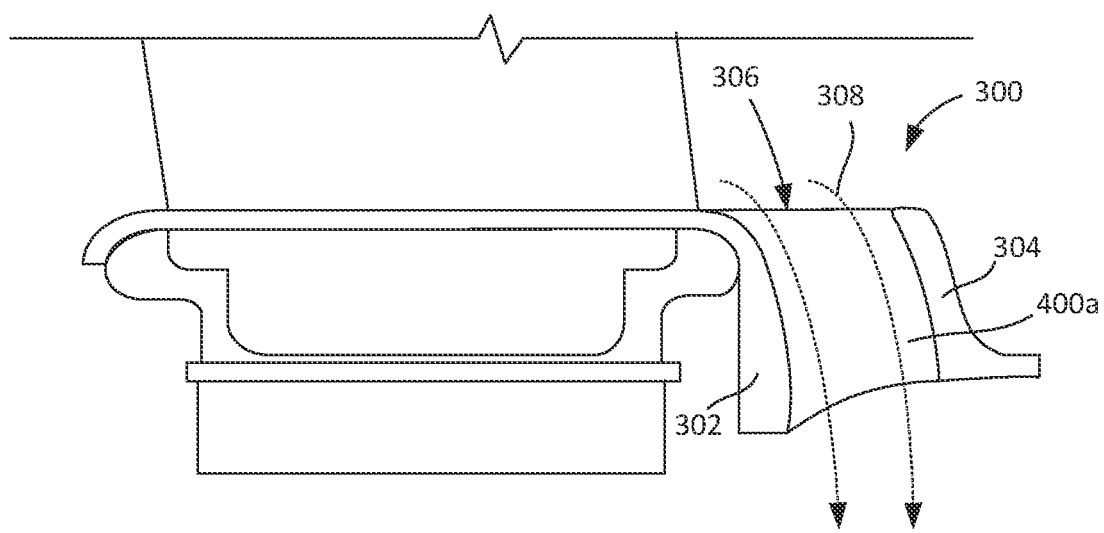
FIG. 6 shows an example in which the example offtake scoop of FIG. 2 does not include a guide vane.

While the example offtake scoop 300 shown in FIGS. 3-5 includes one guide vane 310, in other examples, the offtake scoop 300 may not include any guide vanes. For example, FIG. 6 shows an example where the offtake scoop 300 does not include a guide vane in the channel 306. Instead, the channel 306 is empty. The downstream wall 304 is still coupled to the upstream wall 302 by spaced apart ones of the ribs 400a-400c (one of which is referenced in FIG. 6). The upstream and downstream walls 302, 304 are smooth and curve radially inward. Therefore, the shape of the channel 306 (as defined between the first and second walls 302, 304) directs the airflow 308 in a smooth, laminar manner toward the opening 214 (FIGS. 2 and 3), even without guide vanes.

Therefore, it can be appreciated that examples have been disclosed herein that improve airflow into a bleed opening in a shaft of a compressor. The examples disclosed herein improve bleed pressure recovery and increase bleed air pressure. This improves back flow margin, such as HP turbine cooling supply back flow margin. The example offtake scoops disclosed herein can be added (retrofitted) to compressors on existing gas turbine engines and/or can be added to newly manufacturing gas turbine engines.

Example apparatus, systems, and articles of manufacture to improve bleed airflow in a gas turbine engine are disclosed herein. Further examples and combinations thereof include the following:

Example 1 is a gas turbine engine comprising: a compressor including a casing defining a passageway; a shaft extending through the passageway, the shaft drivingly coupling the compressor and a turbine of the gas turbine engine, the shaft having an opening to receive airflow from the passageway; an inner shroud; stator vanes coupled to and extending radially between the casing and the inner shroud; and an offtake scoop disposed on a downstream side of the inner shroud, the offtake scoop having a channel to direct the airflow radially inward toward the opening in the shaft.

Example 2 includes the gas turbine engine of any preceding clause, wherein the offtake scoop includes an upstream wall and a downstream wall spaced apart from the upstream wall, the channel defined between the upstream and downstream walls.

Example 3 includes the gas turbine engine of any preceding clause, wherein the offtake scoop includes a guide vane disposed in the channel between the upstream and downstream walls.

Example 4 includes the gas turbine engine of any preceding clause, wherein the guide vane has an airfoil-shaped cross-section.

Example 5 includes the gas turbine engine of any preceding clause, wherein the offtake scoop includes a rib extending between the upstream wall and the downstream wall.

Example 6 includes the gas turbine engine of any preceding clause, wherein the rib supports the downstream wall and the guide vane and axially downstream from the upstream wall.

Example 7 includes the gas turbine engine of any preceding clause, wherein the upstream wall, the downstream wall, the guide vane, and the rib are integrally formed.

Example 8 includes the gas turbine engine of any preceding clause, wherein the inner shroud includes a panel, the stator vanes coupled to the panel, the offtake scoop coupled to the panel.

Example 9 includes the gas turbine engine of any preceding clause, wherein the panel includes a plurality of recesses along a downstream edge of the panel, the plurality of recesses to direct the airflow into the channel.

Example 10 includes the gas turbine engine of any preceding clause, wherein the offtake scoop includes a plurality of ribs that divide the channel into channel segments, and wherein each of the plurality of recesses are aligned with respective ones of the channel segments.

Example 11 includes the gas turbine engine of any preceding clause, wherein the panel is a sheet metal panel.

Example 12 includes the gas turbine engine of any preceding clause, wherein the offtake scoop includes a stator discourager extending axially downstream from the downstream wall.

Example 13 includes the gas turbine engine of any preceding clause, further including rotor vanes coupled to and extending radially outward from the shaft, the rotor vanes coupled to the shaft at a hub that is downstream of the inner shroud, the hub including a rotor discourager extending axially upstream, such that the stator discourager and the rotor discourager overlap in a radial direction.

Example 14 includes the gas turbine engine of any preceding clause, wherein a gap is formed between the stator discourager and the rotor discourager.

Example 15 includes the gas turbine engine of any preceding clause, wherein the compressor is a high pressure compressor, and wherein the shaft is a high pressure shaft.

Example 16 is an inner shroud comprising: a panel, wherein radially inner ends of a plurality of stator vanes are coupled to the panel; and an offtake scoop disposed on a downstream side of the panel, the offtake scoop including an upstream wall and a downstream wall spaced apart from the upstream wall such that a channel is formed between the upstream wall and the downstream wall, the channel to direct airflow in the compressor radially inward.

Example 17 includes the inner shroud of any preceding clause, wherein the offtake scoop includes a guide vane in the channel and spaced apart from the upstream wall and the downstream wall.

Example 18 includes the inner shroud of any preceding clause, wherein the guide vane has an airfoil-shaped cross-section.

Example 19 includes the inner shroud of any preceding clause, wherein the offtake scoop includes a rib extending axially between the upstream wall and the downstream wall.

Example 20 includes the inner shroud of any preceding clause, wherein the upstream wall is integrally formed with the panel.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas turbine engine comprising:
 a compressor including a casing defining a passageway;
 a shaft extending through the passageway, the shaft drivingly coupling the compressor and a turbine of the gas turbine engine, the shaft having an opening to receive airflow from the passageway;
 an inner shroud;
 stator vanes coupled to and extending radially between the casing and the inner shroud; and
 an offtake scoop disposed on a downstream side of the inner shroud, the offtake scoop having a channel to direct the airflow radially inward toward the opening in the shaft, the offtake scoop including an upstream wall, a downstream wall spaced apart from the upstream wall, and a rib extending between the upstream wall and the downstream wall, the channel defined between the upstream and downstream walls, the rib cantilevered from the upstream wall, the downstream wall cantilevered from an aft end of the rib such that the rib supports the downstream wall axially downstream of the upstream wall.

2. The gas turbine engine of claim 1, wherein the offtake scoop includes a stator discourager extending axially downstream from the downstream wall.

3. The gas turbine engine of claim 2, further including rotor vanes coupled to and extending radially outward from the shaft, the rotor vanes coupled to the shaft at a hub that is downstream of the inner shroud, the hub including a rotor discourager extending axially upstream, such that the stator discourager and the rotor discourager overlap in a radial direction.

4. The gas turbine engine of claim 3, wherein a gap is formed between the stator discourager and the rotor discourager.

5. The gas turbine engine of claim 3, wherein the rotor discourager extends in a radially outward direction.

6. The gas turbine engine of claim 1, wherein the compressor is a high pressure compressor, and wherein the shaft is a high pressure shaft.

7. The gas turbine engine of claim 1, wherein the offtake scoop includes a guide vane disposed in the channel between the upstream and downstream walls.

8. The gas turbine engine of claim 7, wherein the guide vane has an airfoil-shaped cross-section.

9. The gas turbine engine of claim 7, wherein the rib supports the guide vane axially downstream from the upstream wall.

10. The gas turbine engine of claim 9, wherein the upstream wall, the downstream wall, the guide vane, and the rib are integrally formed.

11. The gas turbine engine of claim 7, wherein the guide vane is equally spaced from the upstream and downstream walls.

12. The gas turbine engine of claim 1, wherein the inner shroud includes a panel, the stator vanes coupled to the panel, the offtake scoop coupled to the panel.

13. The gas turbine engine of claim 12, wherein the panel includes a plurality of recesses along a downstream edge of the panel, the plurality of recesses to direct the airflow into the channel.

14. The gas turbine engine of claim 13, wherein the offtake scoop includes a plurality of ribs that divide the channel into channel segments, and wherein each of the plurality of recesses are aligned with respective ones of the channel segments.

15. The gas turbine engine of claim 12, wherein the panel is a sheet metal panel.

16. The gas turbine engine of claim 12, wherein a downstream side of the panel is curved radially inward and forms the upstream wall.

17. An inner shroud comprising:
a panel, wherein radially inner ends of a plurality of stator vanes are coupled to the panel; and
an offtake scoop disposed on a downstream side of the panel, the offtake scoop including an upstream wall, a downstream wall spaced apart from the upstream wall, and a rib extending between the upstream wall and the downstream wall, the rib cantilevered from the upstream wall, the downstream wall cantilevered from an aft end of the rib such that the rib supports the downstream wall axially downstream of the upstream wall, wherein a channel is formed between the upstream wall and the downstream wall, the channel to direct airflow in a compressor radially inward.

18. The inner shroud of claim 17, wherein the offtake scoop includes a guide vane in the channel and spaced apart from the upstream wall and the downstream wall.

19. The inner shroud of claim 18, wherein the guide vane has an airfoil-shaped cross-section.

20. The inner shroud of claim 17, wherein the upstream wall is integrally formed with the panel.

* * * * *